(12) United States Patent  (10) Patent No.: US 7,414,306 B1
Tan  (45) Date of Patent: Aug. 19, 2008

(54) PREAMPLIFIER INTEGRATED CIRCUIT ON FLEX CIRCUIT FOR MAGNETIC MEDIA STORING DEVICES

(75) Inventor: Kien Beng Tan, Singapore (SG)

(73) Assignee: Marvell International Ltd., Hamilton (BM)

( * ) Notice: Subject to any disclaimer, the term of this patent is extended or adjusted under 35 U.S.C. 154(b) by 1160 days.

(21) Appl. No.: 10/319,391

(22) Filed: Dec. 12, 2002

(51) Int. Cl.
 *H01L 23/52* (2006.01)
 *H01L 23/48* (2006.01)
(52) U.S. Cl. .................. 257/691; 257/690; 257/693; 257/698; 257/700
(58) Field of Classification Search ......... 257/690–691, 257/693, 698, 700–703, 723, 725, 737; 710/8
 See application file for complete search history.

(56) References Cited

U.S. PATENT DOCUMENTS 5,300,839 A * 4/1994 Kawahara et al. ............. 327/52
5,744,898 A * 4/1998 Smith et al. .................. 310/334
6,249,824 B1 * 6/2001 Henrichs ....................... 710/8

\* cited by examiner

*Primary Examiner*—Ori Nadav

(57) ABSTRACT

A preamplifier integrated circuit (IC) for a magnetic storage device includes a plurality of channels, each including at least one preamplifier and one or more interconnecting layers. A passivation layer is arranged adjacent to the interconnecting layers. A plurality of first external connections are arranged in openings in the passivation layer, are in contact with at least one of the interconnecting layers and are adapted to distribute a first potential to the preamplifiers. The plurality of channels are arranged in a plurality of groups, each of the plurality of groups includes at least one of the channels. At least one of the first external connections independently communicates with at least a respective one of the plurality of channels. The first potential is distributed to a respective one of the plurality of groups via the corresponding at least one of the external connections.

26 Claims, 4 Drawing Sheets

PREAMPLIFIER INTEGRATED CIRCUIT ON FLEX CIRCUIT FOR MAGNETIC MEDIA STORING DEVICES

FIELD OF THE INVENTION

The present invention relates to devices for reading and writing on magnetic recording media, and more particularly to a preamplifier integrated circuit and a flex circuit for reading and/or writing channels of a magnetic storage device.

BACKGROUND OF THE INVENTION

Conventional magnetic storing devices such as disk drives read information from and write information to a magnetic storage medium. The disk drive typically includes a moveable arm that is positioned relative to the magnetic storage medium by a high speed linear motor or another positioning device. The arm is usually associated with multiple read and/or write channels.

Information is written to the magnetic storage medium using a write channel and a write circuit. Each write channel and circuit is capable of inducing a magnetic field with a first or second polarity adjacent to the magnetic storage medium, which stores the magnetic field. One polarity represents one digital value (such as a "1"). The opposite polarity represents the other digital value (such as a "0"). Information is read from the magnetic storage medium using a read channel and read circuit. Each read channel and circuit is capable of sensing the magnetic field stored on the magnetic storage medium.

Referring now to FIG. 1, an single-layer flexible substrate or flex circuit 10 is mounted on or otherwise connected to an arm (not shown) of a disk drive (not shown). The flex circuit 10 can be a flexible substrate as shown. While a specific outer shape of the flex circuit 10 is shown, the shape of the flex circuit 10 will vary according to the specific application.

A connector 14 can be mounted on or otherwise connected to the flex circuit 10. The connector 14 typically provides a first mating plug for receiving a second mating plug (both not shown). The second mating plug may be connected by conductors or wires to a read channel of the disk drive. A preamplifier IC 18 is also mounted on or otherwise connected to the flex circuit 10. Inductive elements 20 such as inductive coils or other devices are generally located near one end of the flex circuit 10. Typically, one or more inductive elements 20 are associated with each read and/or write channel.

The flex circuit 10 includes traces that are generally identified at 22. The traces 22 provide connections from the connector 14 to the preamplifier IC 18. Likewise, the flex circuit 10 includes traces that are generally identified at 24 (only one shown). The traces 24 provide connections from the preamplifier chip 18 to the inductive elements 20.

Referring now to FIG. 2, the flex circuit 10 typically includes a flexible substrate 30 and a patterned conductive layer 34 formed on the substrate 30 that defines the traces 22 and 24. The traces 22 and 24 relay read and/or write inputs/outputs (I/O), power and ground to and from the connector 14, the preamplifier IC 18 and/or the inductive elements 20. An insulating layer 38 may also be formed on an outer surface of the patterned conductive layer 34 to insulate the traces 22 and 24. While a single patterned conductive layer 34 is shown, multiple patterned conductive layers 34 may be provided. If multiple patterned conductive layers 34 are provided, they can optionally be interconnected by vias. While the flex circuit 10 is shown, other circuits such as printed circuit boards (PCBs) can be used.

The preamplifier IC 18 is typically formed on a wafer using photolithography. Film deposition, masking, etching and doping steps are repeated several times until all of the active devices of the preamplifier IC have been formed. Then, the individual devices in each preamplifier IC are interconnected using one or more metal layers, which are separated by insulating layers. Vias provide interconnections between the separated metal layers. After the last metal layer has been patterned, a passivation layer is deposited to protect the IC from damage and/or contamination. Openings are etched in the passivation layer of the preamplifier chip 18 to allow electrical contact to be made with the metal layers using solder bumps and traces on the flex circuit 10.

The preamplifier circuit 18 typically includes multiple read and/or write channels and requires connections to read and/or write I/O, one or more power sources, and ground. Typically, the power supply voltages are delivered to the preamplifier IC 18 using a trace and a solder bump. After reaching the IC, power distribution is performed in the metal layers of the IC. Ground and the other power supply signals are also distributed in the metal layers of the IC in a similar manner.

As the number of read and write channels increases, the number of interconnections that must be patterned in the metal layers of the IC also increases. As the number of interconnections increases, the complexity of the metal interconnection layers that are used for power and ground also increases. The increased complexity and/or additional metal layers further increase the cost of fabricating the preamplifier IC. Since power distribution is performed in the metal layers of the IC, relatively high currents and voltages must be carried by sub-micron traces in the metal layers of the IC and by the solder bumps. $I^2R$ heating in the metal layers will also increase die temperatures during operation.

SUMMARY OF THE INVENTION

A preamplifier integrated circuit (IC) for a magnetic storage device includes a plurality of channels, each including at least one preamplifier and one or more interconnecting layers. A passivation layer is arranged adjacent to the interconnecting layers. A plurality of first external connections are arranged in openings in the passivation layer, are in contact with at least one of the interconnecting layers and are adapted to distribute a first potential to the preamplifiers. The plurality of channels are arranged in a plurality of groups, each of the plurality of groups includes at least one of the channels. At least one of the first external connections independently communicates with at least a respective one of the plurality of channels. The first potential is distributed to a respective one of the plurality of groups via the corresponding at least one of the external connections.

In other features of the invention, second external connections are arranged in the openings in the passivation layer, contact at least one of the interconnecting layers and are adapted to distribute a reference potential to the preamplifiers. At least one of the second external connections independently communicates with at least the respective one of the plurality of channels. The reference potential is distributed to the respective one of the plurality of groups via the corresponding at least one of the external connections.

In other features, the first external connections are arranged one of radially inside and radially outside of the second external connections. Second traces are arranged on an outer surface of the passivation layer. The second external connections are connected together using the second traces.

In still other features, third external connections are arranged in the openings in the passivation layer, contact at least one of the interconnecting layers and are adapted to distribute a second potential to the preamplifiers. At least one of the third external connections independently communicates with at least the respective one of the plurality of channels. The second potential is distributed to the respective one of the plurality of groups via the corresponding at least one of the third external connections.

In still other features, the first external connections can be connected together using a first trace. The third external connections can be connected together using a third trace that does not overlap the first trace.

In other features, ground shield external connections can be connected using a ground shield trace. Second external connections are arranged in openings in the passivation layer, contact at least one of the interconnecting layers and are adapted to independently distribute the reference potential to the groups. A second trace is arranged on an outer surface of the passivation layer. The second external connections are connected together using the second trace. The first and third traces are arranged between the ground shield trace and the second trace. The second trace on the passivation layer connects the ground shield external connections to the second external connections.

In still other features, an insulating layer is arranged adjacent to the second trace. Fourth external connections are arranged on the passivation layer that are associated with at least one of read and write inputs/outputs. A first group of traces arranged on the passivation layer that connect the fourth external connections to the preamplifiers. The preamplifiers include at least one of a read preamplifier and a write preamplifier.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
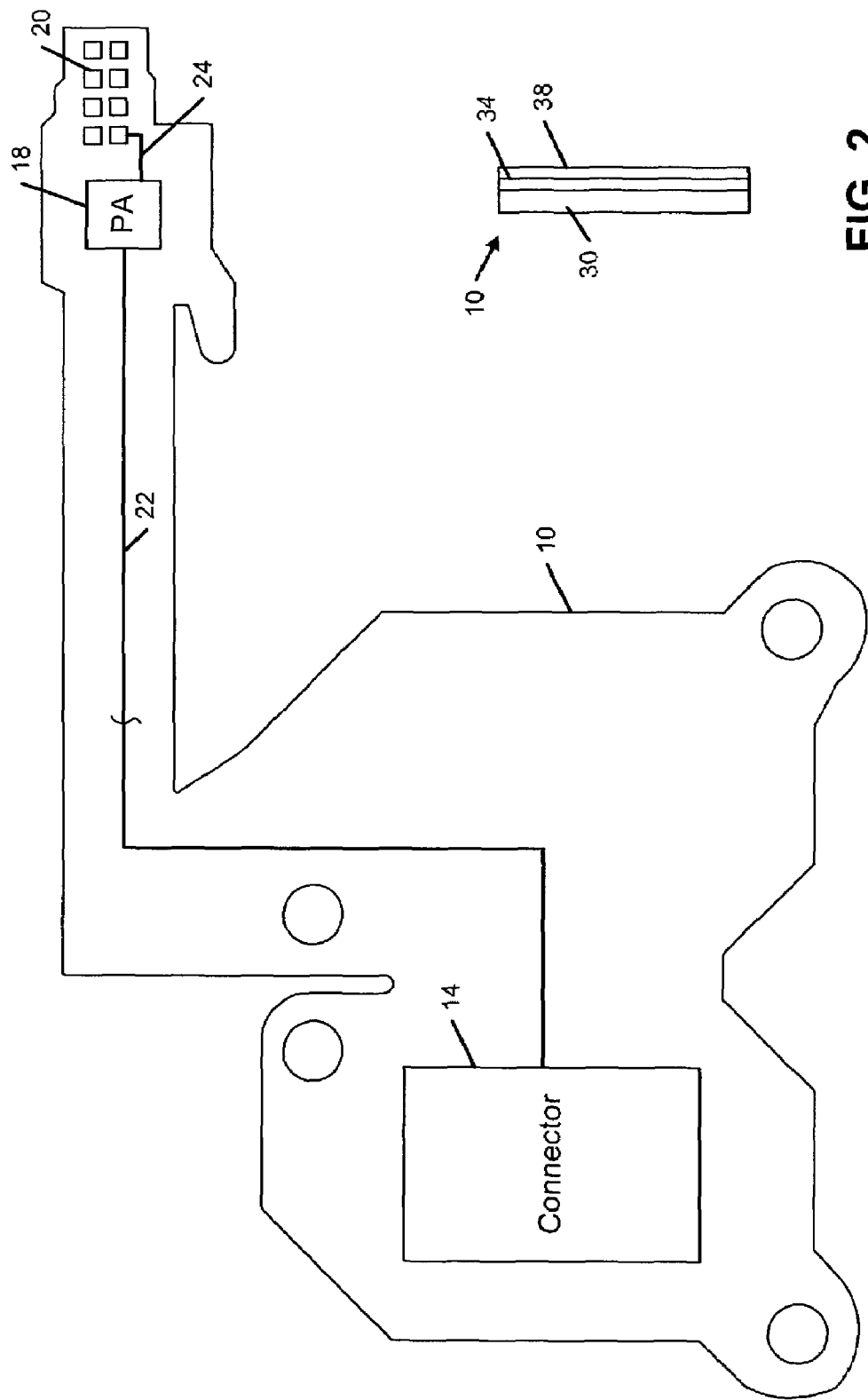
FIG. 1 illustrates a connector and a preamplifier (PA) integrated circuit (IC) mounted on a flex circuit according to the prior art.
Figure 2:
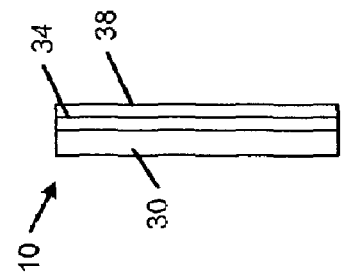
FIG. 2 is a cross-sectional view of the flex circuit according to the prior art.

The following description of the preferred embodiment(s) is merely exemplary in nature and is in no way intended to limit the invention, its application, or uses. For purposes of clarity, the same reference numbers will be used in the drawings to identify similar elements.

Figure 3:
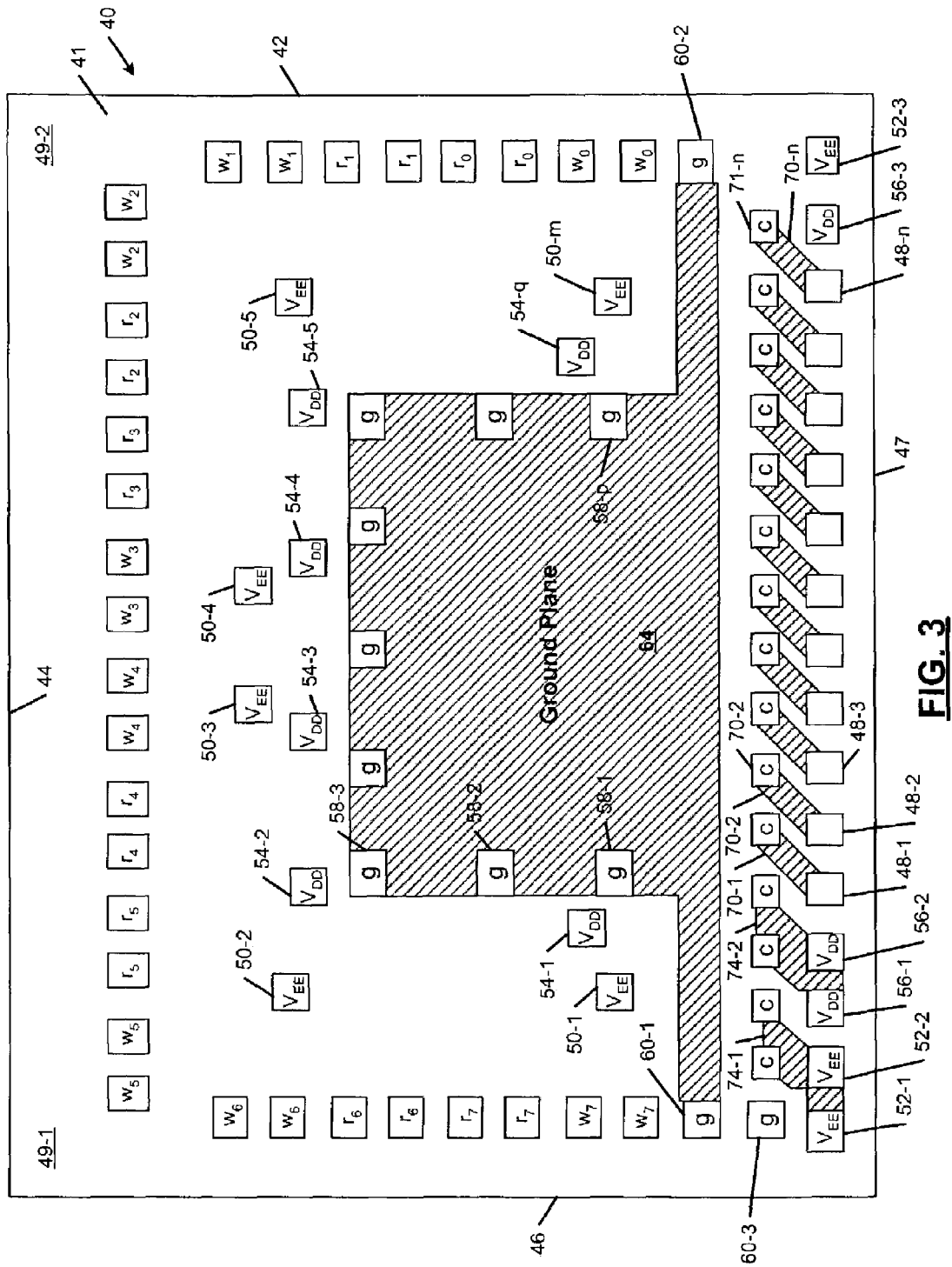
FIG. 3 is a bottom plan view illustrating solder bumps and the passivation layer of the preamplifier IC according to the present invention.

Referring now to FIG. 3, a bottom plan view of a preamplifier IC 40 according to the present invention is shown. The preamplifier IC 40 includes a plurality of channels that include read and/or write channels. Each channel is associated with one or more conventional preamplifier circuits as is known in the art. Connections are made to the preamplifier IC 40 using solder bumps that are connected to one or more of the metal layers of the preamplifier IC 40 through openings etched in a passivation layer 41 of the preamplifier IC 40.

For example, in the exemplary embodiment, the preamplifier IC 40 includes eight write channels $w_0$, $w_1$, $w_2$, $w_3$, $w_4$, $w_5$, $w_6$, and $w_7$ and eight read channels $r_0$, $r_1$, $r_2$, $r_3$, $r_4$, $r_5$, $r_6$, and $r_7$. Write and read channels $w_0$, $r_0$, $r_1$ and $w_1$ are located (from bottom to top) along a first edge 42. Write and read channels $w_2$, $r_2$, $w_3$, $r_3$, $w_4$, $r_4$, $r_5$, and $w_5$ are located (from right to left) along a second edge 44. Write and read channels $w_6$, $r_6$, $r_7$ and $w_7$ are located (from top to bottom) along a third edge 46. Read/write I/O solder bumps 48-1, 48-2, ..., and 48-n (collectively identified as 48) are located along a fourth edge 47. In the exemplary embodiment in FIG. 3, the read/write I/O solder bumps 48 are associated with WDY, WDX, LB, RDY, RDX, SDATA, SCLK, SDEN, ABHV, FLT, and WRN inputs and outputs.

The write and read channels are preferably arranged on opposite sides of corners 49-1 and 49-2 of the preamplifier circuit 18 to reduce the number of solder bumps, as will be described below. For example, write channels $w_1$ and $w_2$ are located adjacent to each other in one corner 49-2. Write channels $w_5$ and $w_6$ are located adjacent to each other in another corner 49-1. As can be appreciated, the relative positions of the read channels, write channels, power supplies, ground, and read/write I/O can be altered from that shown in FIGS. 3 and 4 without departing from the scope of the present invention.

First solder bumps 50-1, 50-2, ... and 50-m (generally identified by reference number 50) are formed in openings in the passivation layer 41 and are used to distribute a first voltage level $V_{EE}$ to the preamplifier IC 40. While solder bumps are disclosed, any external connection may be used. The first solder bumps 50 are preferably formed in a "U"-shape or ring. Additional solder bumps 52-1, 52-2, and 52-3 are used to bring the first voltage source onto the preamplifier IC 40 and to terminate the circuit. Preferably, and the first solder bumps 50 are located closest to corresponding write channels. For example, solder bump 50-1 is located closest to $W_7$ and solder bump 50-2 is located closest to $w_6$ and $w_5$.

Second solder bumps 54-1, 54-2, ... and 54-q (generally identified by reference number 54) are formed in openings in passivation layer 41 and are used to distribute a second voltage level $V_{DD}$ to the preamplifier IC 40. The second solder bumps 54 are preferably formed in a "U" shape or ring inside or outside of the first solder bumps 50. Additional solder bumps 56-1, 56-2, and 56-3 are used to bring the second voltage source $V_{DD}$ onto the preamplifier IC 40 and to terminate the circuit.

Third solder bumps 58-1, 58-2, ... and 58-p (generally identified by reference number 58) are formed in the openings in passivation layer 41 and are used to distribute ground to the preamplifier IC 40. The third solder bumps 58 are preferably formed in a "U" shape or ring inside of the first and second solder bumps 50 and 54, respectively. Additional solder bumps 60-1 and 60-2 are used to bring ground on-chip. The solder bumps 52, 56 and 60 may be formed on top of the passivation layer 41 and/or in openings etched into the passivation layer 41.

Each channel includes a read channel and/or a write channel. A group includes one or more channels. One or more solder bumps 54 are used to connect $V_{DD}$ to each group. One or more solder bumps 50 are used to connect $V_{EE}$ to each group. One or more solder bumps 58 are used to connect ground to each group. For example in FIGS. 3 and 4, there are six groups. Two of the groups are associated with two read/write channels. Specifically, $V_{DD}$ 54-1 and $V_{EE}$ 50-1 are associated with $w_7$ and $r_7$. $V_{DD}$ 54-2 and $V_{EE}$ 50-2 are associated with $w_6$, $r_6$, $w_5$, and $r_5$. $V_{DD}$ 54-3 and $V_{EE}$ 50-3 are associated with $W_4$ and $r_4$. $V_{DD}$ 54-4 and $V_{EE}$ 50-4 are associated with $W_3$ and $r_3$. $V_{DD}$ 54-5 and $V_{EE}$ 50-5 are associated with $w_2$, $r_2$, $w_1$, and $r_1$. $V_{DD}$ 54-6 and $V_{EE}$ 50-6 are associated with $w_0$ and $r_0$.

A conducting layer is formed on the passivation layer 41. This conducting layer connects the solder bumps 58-1, 58-2, . . . and 58-$p$ to form a ground plane 64.

The read/write I/O solder bumps 48 are formed on top of the passivation layer 41. Traces 70-1, 70-2, . . . and 70-$n$ that are formed on the passivation layer 41 provide a connection to corresponding interconnects defined by metal layers of the preamplifier IC 40. As can be appreciated, by forming the solder bumps 48 and providing traces on the passivation layer 41, post processing can be used to adapt the preamplifier IC 40 to flex circuits 10' that are provided by different manufacturers. In other words, alignment variations can be adjusted using the traces 70 without requiring changes to the preamplifier IC 40 die.

Trace 74-1 connects the solder bump 52-1 to the second solder bump 52-2 (associated with the first voltage source $V_{EE}$) and/or to metal layers of the preamplifier chip 40. Trace 74-2 connects the solder bump 56-1 to the second solder bump 56-2 (associated with the second voltage source $V_{DD}$) and/or to the metal layers of the preamplifier chip 40 to power other circuits.

Figure 4:
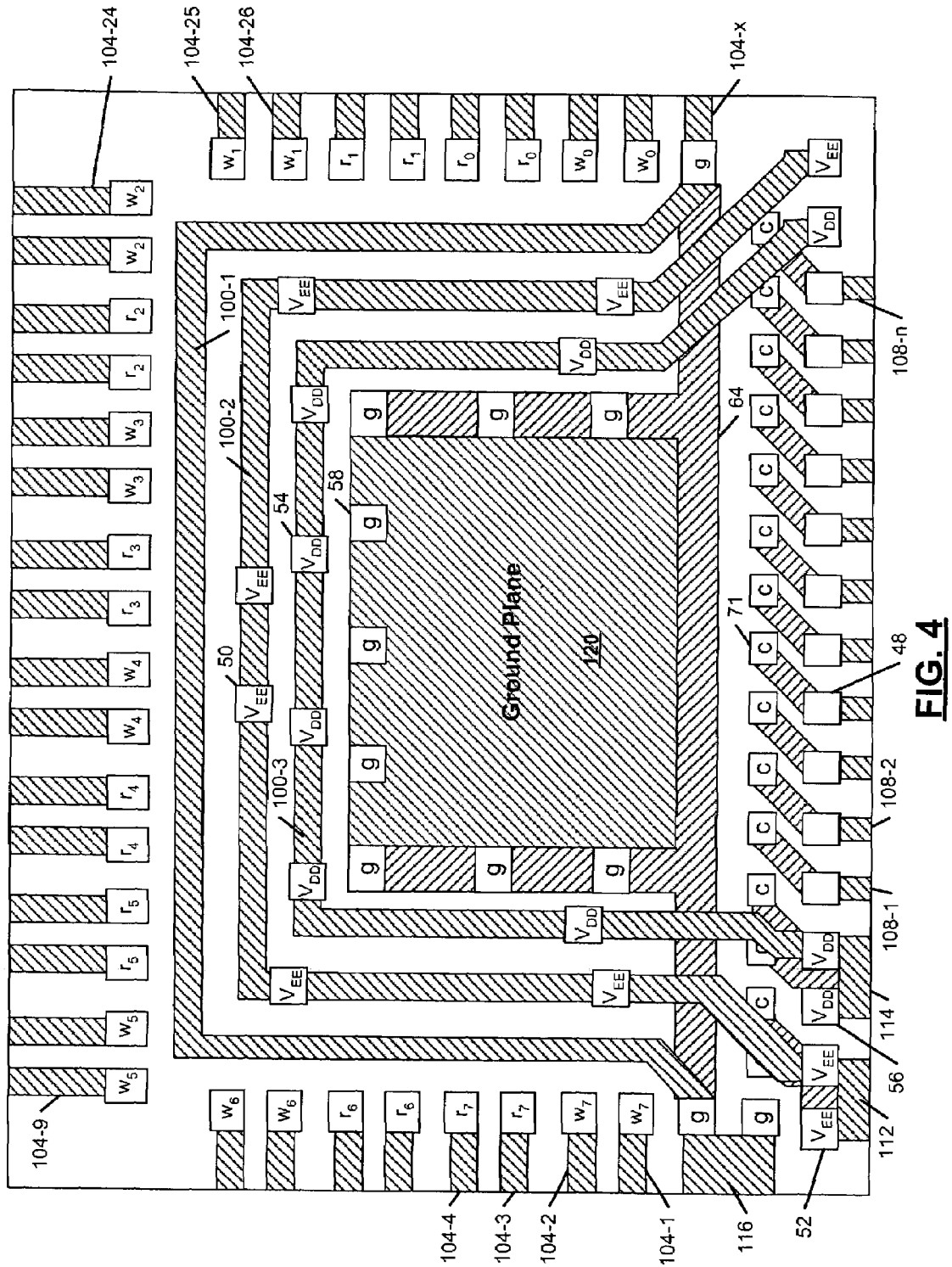
FIG. 4 illustrates the preamplifier IC of FIG. 3 and traces and a ground plane of a flex circuit according to the present invention.

Referring now to FIGS. 3 and 4, a flex circuit 10' according to the present invention includes first, second and third traces 100-1, 100-2 and 100-3. The first trace 100-1 provides a second ground shield between read/write channels and the power supply voltages $V_{DD}$ and $V_{EE}$. The second trace 100-2 distributes $V_{EE}$ to the solder bumps 50 and the preamplifier circuits. The third trace 100-3 distributes $V_{DD}$ to the solder bumps 54 and the preamplifier circuits. The flex circuit 10' includes traces 104-1, 104-2, . . . , and 104-$x$ that provide connections between the inductive elements 20 and the individual read and write circuits.

The flex circuit 10' includes traces 108-1, 108-2, . . . 108-$n$ that provide connections between read/write I/O of the connector 14 and the read/write bumps 48-1, 48-2, . . . and 48-$n$ of the preamplifier circuit 40. The flex circuit 10' includes traces 112, 114 and 116 that provide a connection between the voltage source inputs and ground of the connector 14 and the preamplifier circuit 40. The flex circuit 10' includes a ground plane 120 that contacts the ground solder bumps 58-1. 58-2, . . . and 58-$p$ and the traces 64. The ground plane 120 and ground plane 64 act as a heat sink to dissipate heat generated by the preamplifier.

More particularly, the first trace 100-1 is connected to ground solder bumps 60-1 and 60-2. The second trace 100-2 is connected to solder bumps 50 and 52. The third trace 100-3 is connected to solder bumps 54 and 56. The ground plane 120 is connected to solder bumps 58 and the traces 64.

Figure 5:
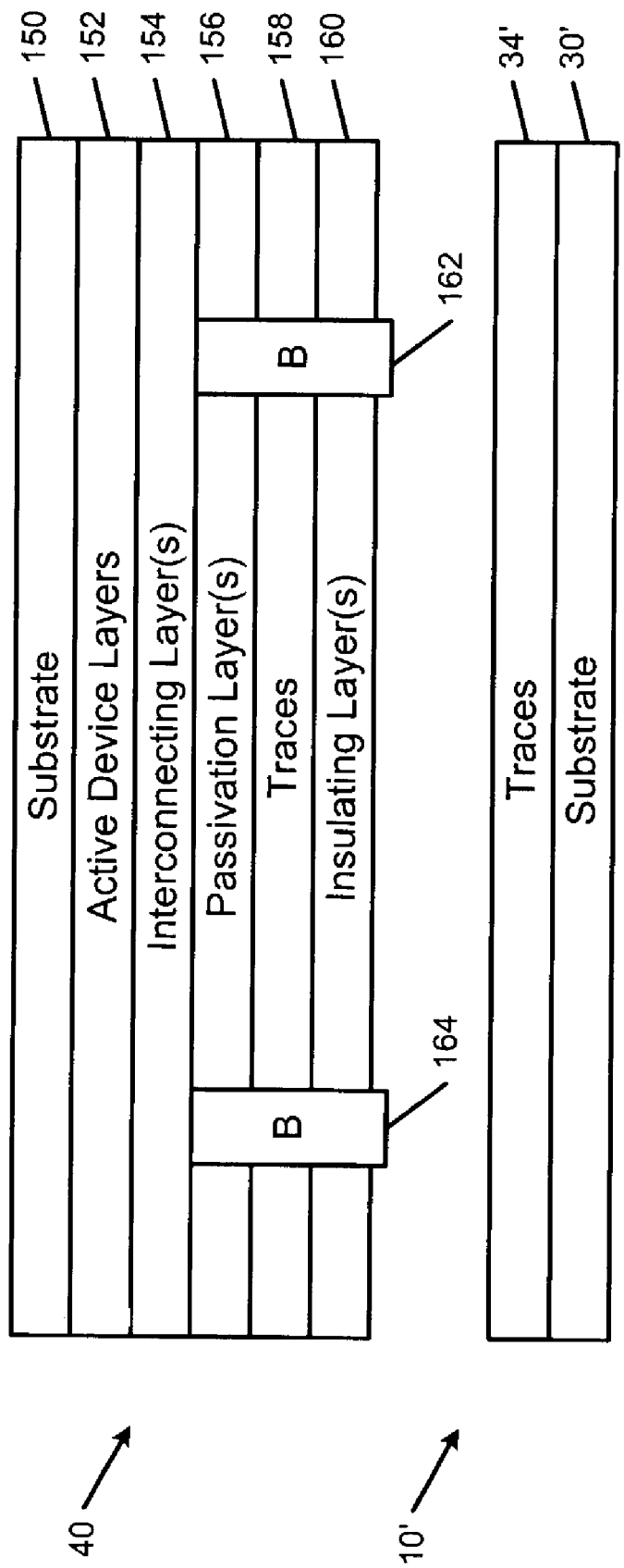
FIG. 5 illustrates a side cross-sectional view of the preamplifier IC.

Referring now to FIG. 5, a side cross-sectional view of the preamplifier circuit assembly including the preamplifier IC 40 and the flex circuit 10' is shown. The preamplifier IC 40 includes a substrate 150 with active device layers 152. One or more interconnecting layers 154 are formed on the active device layers 152. One or more passivation layers 156 are formed on the interconnecting layers 154. Traces 158 (for example defining ground plane 64) are formed on the passivation layer 156. One or more insulating layer(s) 160 maybe formed over the traces 158. Solder bumps 162 and 164 provide a connection between the traces 34' on the flex circuit 10' and the interconnecting layers 154 when the preamplifier IC 40 is mounted or otherwise connected to the flex circuit 10'.

As can be appreciated, the first trace 100-1 provides a ground shield that surrounds the traces 100-2 and 100-3 to reduce noise from the voltage sources $V_{EE}$ and $V_{DD}$. The ground planes 64 and 120 provide heat dissipation. The flex circuit 10' and the preamplifier IC 40 allow power and ground to be routed to every channel on the preamplifier chip 40 through traces on the single-layer flex circuit 10'. The distribution of power using the traces and the increased number of solder bumps reduces die temperatures of the preamplifier IC 40. The increased width of the traces on the passivation layer 41 have a reduce resistance (as compared with traces in the metal layers of the preamplifier IC), which reduces $I^2R$ losses. The present invention also reduces the complexity of interconnections that need to be made in the interconnecting layers of the preamplifier IC, which reduces cost.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A preamplifier integrated circuit (IC) for a magnetic storage device comprising:
   a plurality of preamplifiers;
   a plurality of channels, each including at least one of said preamplifiers;
   one or more interconnecting layers;
   a passivation layer arranged adjacent to said interconnecting layers; and
   a plurality of first external connections that are external to the IC that are arranged in openings in said passivation layer, that are in contact with at least one of said interconnecting layers and that are adapted to distribute a first potential to said preamplifiers,
   wherein said plurality of channels are arranged in a plurality of groups, each of said plurality of groups includes at least one of said channels,
   wherein at least one of said first external connections independently communicates with each of said groups, and
   wherein the first potential is distributed to respective ones of said plurality of groups via said first external connections.

2. The preamplifier IC of claim 1 further comprising:
   second external connections that are arranged in the openings in said passivation layer, that contact at least one of said interconnecting layers and that are adapted to distribute a reference potential to said preamplifiers,
   wherein at least one of said second external connections independently communicates with each of said groups, and
   wherein the reference potential is distributed to the respective one of said plurality of groups via the corresponding at least one of said external connections.

3. The preamplifier IC of claim 2 wherein said first external connections are arranged one of radially inside and radially outside of said second external connections.

4. The preamplifier IC of claim 2 further comprising second traces arranged on an outer surface of said passivation layer, wherein said second external connections are connected together using said second traces.

5. The preamplifier IC of claim 1 further comprising:
third external connections that are arranged in the openings in said passivation layer, that contact at least one of said interconnecting layers and that are adapted to distribute a second potential to said preamplifiers,
wherein at least one of said third external connections independently communicates with each of said groups, and
wherein the second potential is distributed to the respective one of said plurality of groups via the corresponding at least one of said third external connections.

6. The preamplifier IC of claim 5 wherein said first external connections can be connected together using a first trace and wherein said third external connections can be connected together using a third trace that does not overlap the first trace.

7. The preamplifier IC of claim 6 further comprising:
ground shield external connections that can be connected using a ground shield trace;
second external connections that are arranged in openings in said passivation layer, that contact at least one of said interconnecting layers and that are adapted to independently distribute the reference potential to said groups; and
a second trace arranged on an outer surface of said passivation layer, wherein said second external connections are connected together using said second trace, and wherein the first and third traces are arranged between the ground shield trace and said second trace.

8. The preamplifier IC of claim 7 wherein said second trace on said passivation layer connects said ground shield external connections to said second external connections.

9. The preamplifier IC of claim 8 further comprising an insulating layer arranged adjacent to said second trace.

10. The preamplifier IC of claim 1 further comprising:
fourth external connections arranged on said passivation layer that are associated with at least one of read and write inputs/outputs; and
a first group of traces arranged on said passivation layer that connect said fourth external connections to said preamplifiers.

11. The preamplifier IC of claim 1 wherein said preamplifiers include at least one of a read preamplifier and a write preamplifier.

12. The preamplifier integrated circuit (IC) of claim 1 wherein said plurality of first external connections comprise solder bumps.

13. The preamplifier integrated circuit (IC) of claim 2 wherein the reference potential is a ground potential.

14. A preamplifier circuit assembly for a magnetic storage device, comprising:
a preamplifier integrated circuit (IC) including:
a plurality of preamplifiers;
a plurality of channels, each including at least one of said preamplifiers;
one or more interconnecting layers;
a passivation layer arranged adjacent to said interconnecting layers; and
a plurality of first external connections that are external to said IC, that are arranged in openings in said passivation layer, that contact at least one of said interconnecting layers and that are adapted to independently distribute a first potential to said groups,
wherein said plurality of channels are arranged in a plurality of groups, each of said plurality of groups includes at least one of said channels,
wherein at least one of said first external connections independently communicates with each of said groups, and
wherein the first potential is distributed to respective one of said plurality of groups via said first external connections; and
a substrate including a first trace arranged on said substrate, wherein said preamplifier IC is mounted on said substrate and said first trace connects said first external connections.

15. The preamplifier circuit assembly of claim 14 further comprising second external connections that are arranged in openings in said passivation layer, that contact at least one of said interconnecting layers and that are adapted to distribute a reference potential to said preamplifiers,
wherein at least one of said second external connections independently communicates with each of said groups, and
wherein the reference potential is distributed to the respective one of said plurality of groups via the corresponding at least one of said second external connections.

16. The preamplifier circuit assembly of claim 15 wherein said first external connections are arranged one of radially inside and radially outside of said second external connections.

17. The preamplifier circuit assembly of claim 15 further comprising second traces arranged on an outer surface of said passivation layer, wherein said second external connections are connected together using said second traces to form a first ground plane.

18. The preamplifier circuit assembly of claim 14 further comprising:
third external connections that are arranged in openings in said passivation layer, that contact at least one of said interconnecting layers and that are adapted to distribute a second potential to said preamplifiers,
wherein at least one of said third external connections independently communicates with each of said groups, and
wherein the second potential is distributed to the respective one of said plurality of groups via the corresponding at least one of said external connections.

19. The preamplifier circuit assembly of claim 18 wherein said third external connections are connected together using a third trace on said substrate that does not overlap said first trace.

20. The preamplifier circuit assembly of claim 19 further comprising:
ground shield external connections;
a ground shield trace on said substrate that connects said ground shield external connections;
second external connections that are arranged in openings in said passivation layer, that contact at least one of said interconnecting layers and that are adapted to independently distribute ground to said groups; and
a second trace arranged on an outer surface of said passivation layer, wherein said second external connections are connected together using said second trace, and wherein said first and third traces are arranged between said ground shield trace and said second trace.

21. The preamplifier circuit assembly of claim 20 wherein said second trace on said passivation layer connects said ground shield external connections to said second external connections.

22. The preamplifier circuit assembly of claim 21 further comprising an insulating layer arranged on said second trace.

23. The preamplifier circuit assembly of claim 14 further comprising:
   fourth external connections arranged on said passivation layer that are associated with at least one of read and write inputs/outputs; and
   a first group of traces arranged on said passivation layer that connect said fourth external connections to the preamplifiers.

24. The preamplifier circuit assembly of claim 14 wherein said preamplifiers include at least one of a read preamplifier and a write preamplifier.

25. The preamplifier circuit assembly of claim 15 wherein the reference potential is a ground potential.

26. The preamplifier circuit assembly of claim 14 wherein said plurality of first external connections comprise solder bumps.

* * * * *

UNITED STATES PATENT AND TRADEMARK OFFICE
CERTIFICATE OF CORRECTION

| | |
|---|---|
| PATENT NO. | : 7,414,306 B1 |
| APPLICATION NO. | : 10/319391 |
| DATED | : August 19, 2008 |
| INVENTOR(S) | : Kien Beng Tan |

It is certified that error appears in the above-identified patent and that said Letters Patent is hereby corrected as shown below:

Column 1, Line 32      Delete "an" and insert -- a --
Column 6, Line 2      Delete "maybe" and insert -- may be --

Signed and Sealed this

Twenty-first Day of October, 2008

JON W. DUDAS
*Director of the United States Patent and Trademark Office*